Aug. 29, 1972    J. JAMIESON    3,687,750

METHOD OF INSCRIBING CEMETERY MEMORIALS

Filed Jan. 5, 1970    2 Sheets-Sheet 1

INVENTOR
JOHN JAMIESON

BY
Oberlin, Maky, Donnelly & Renner
ATTORNEYS

Aug. 29, 1972     J. JAMIESON     3,687,750

METHOD OF INSCRIBING CEMETERY MEMORIALS

Filed Jan. 5, 1970     2 Sheets-Sheet 2

INVENTOR
JOHN JAMIESON

BY
Oberlin, Maky, Donnelly & Renner
ATTORNEYS

United States Patent Office 3,687,750
Patented Aug. 29, 1972

3,687,750
METHOD OF INSCRIBING CEMETERY MEMORIALS
John Jamieson, Chagrin Falls, Ohio 44022
Continuation-in-part of application Ser. No. 645,983, June 14, 1967. This application Jan. 5, 1970, Ser. No. 763
Int. Cl. B44c 1/00
U.S. Cl. 156—63     12 Claims

ABSTRACT OF THE DISCLOSURE

A method of inscribing cemetery memorials by accurately prearranging individual pre-cut or partially pre-cut letters and the like in the desired order and spaced relation and subsequently taping the several letters together to permit handling of the letters as one or more units for ease of adhesively bonding the several letters in position on the stone to be inscribed by sandblasting.

BACKGROUND OF THE INVENTION

This application is a continuation-in-part of my co-pending application Ser. No. 645,983, filed June 14, 1967, now abandoned and relates to a new and improved method of inscribing cemetery memorials which may be performed by unskilled personnel in a more accurate and expeditious manner than previous known methods at a substantial savings in time and cost.

Heretofore, it was the usual practice when inscribing memorial stones to lay out the desired inscription in pencil on a rubber-like stencil covering the face of the stone and then carefully cut the inscription out by hand using a stencil cutting knife, after which the stone was subjected to a sandblasting operation. The stone was protected from the blast except where the stencil had been cut away and accordingly the abrading action of the grit would carve or erode the inscription in the exposed surface.

Although the results obtained by the method just described are generally satisfactory if performed by skilled workmen, there is at present a lack of skilled stencil cutters and consequently much of the stencil cutting is inferior. Moreover, both the laying out and cutting of the inscription by hand takes considerable time, thereby making it an expensive operation, and even for skilled stencil cutters it is extremely difficult to obtain the desired uniformity of letters and the like which make up the inscription. A slip of the knife requires patching of the stencil at additional time and expense.

There have been various attempts by memorial makers to use individual pre-cut letters for the inscription layout which would save the time required to draw and cut the inscription by hand and also achieve the desired uniformity of letters. However, the problems encountered in locating the letters in the final desired position on the stone with the proper spacing between the letters have thus far made their use impractical. Holders and spacers of various types have been devised to assist the inscriber in the placement of the letters, but they are generally too unwieldy to be of much value and it is difficult to transfer the letters from the holders to the stone without disturbing their relative positions.

SUMMARY OF THE INVENTION

The method of the present invention also contemplates using individual pre-cut or partially pre-cut letters and the like, but such method eliminates the difficulties previously encountered in letter placement since the letters are positioned in the desired relation with respect to each other before they are firmly attached to the stone and taped together to permit handling of the letters as a unit and applying adhesive to their backs or to the stone and subsequently locating the letters on the stone without disturbing their relative positions.

It is accordingly a principal object of this invention to provide a method of inscribing cemetery memorials which may be performed more expeditiously and with better results than prior known memorial inscribing techniques.

Another object is to provide such a method in which individual pre-cut or partially pre-cut letters are used to save the time and expense involved in laying out and cutting the letters by hand and insure uniformity of the letters. All of the pre-cut letters may be perfectly formed by die cutting the letters, which is not possible when the letters are hand cut.

Still another object is to provide such a method in which the letters are prearranged and connected together to permit handling of the letters as a unit without disturbing their prearranged relative positions.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 3 showing the letter blocks which constitute the first line of the inscription in direct contact with the stone and taped together to permit handling as a unit;

FIG. 4 showing the taped letter blocks of FIG. 3 swung out of contact with the stone as a unit to permit the application of adhesive to the stone or backs of the letter blocks; and FIG. 5 showing the complete inscription properly laid out on the stone ready for sandblasting;

FIG. 8 showing the blocks with partially precut letters therein face down in reverse order to permit application of a rubber cement coated paper to their back sides for joining the blocks together;

FIG. 9 showing the taped letter blocks face up in proper position on the stone and taped to the stone along one edge to permit the blocks to be swung out of contact with the stone;

FIG. 10 showing the blocks of FIG. 9 swung out of contact with the stone as a unit to permit removal of the rubber cement coated paper from the back sides of the blocks; and FIG. 11 showing the blocks in position on the stone ready for sandblasting.

DESCRIPTION OF THE PREFERRED EMBODIMENTS

Figure 1:
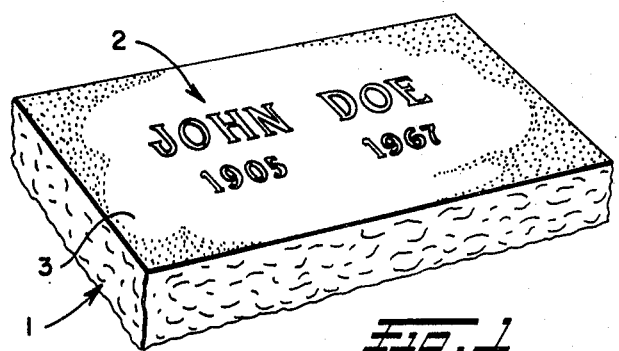
FIG. 1 is a perspective view of a typical memorial stone having a simple inscription thereon which may be made in accordance with the various methods of the present invention.
Figure 7:
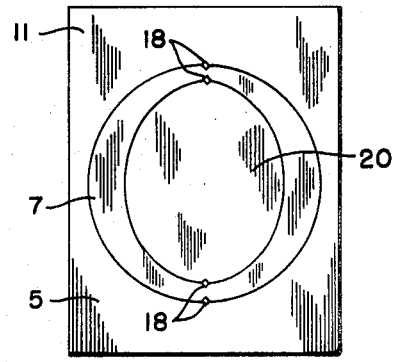
FIG. 7 is an enlarged schematic top plan view of one of the letter blocks included in the inscription layout.
Figure 2:
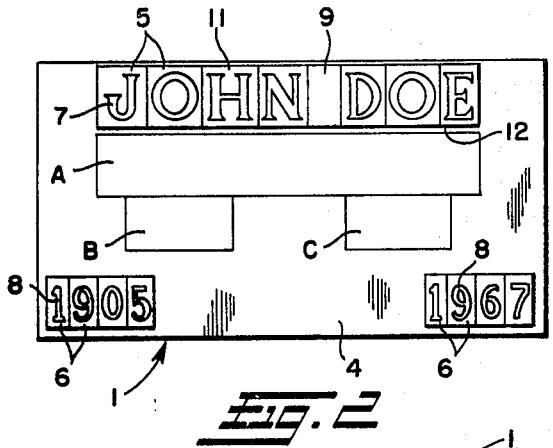
FIGS. 2–5 are schematic top plan views of the stone of FIG. 1 showing the various steps of the method which are followed in preparing the stone for sandblasting the inscription; specifically, FIG. 2 showing a conventional rubber stencil covering the stone with blocks having partially pre-cut letters and numbers therein comprising the inscription positioned on the stencil to facilitate laying out of the area to be covered by the blocks during sandblasting.

In FIG. 1 there is shown a typical memorial headstone 1 of marble or granite having a simple inscription 2 thereon identifying the name of the deceased and his date of birth and death. To make such an inscription in accordance with the method of the present invention, the face 3 of the stone 1 on which the inscription is to be placed is first covered with a thin sheet 4 of commercially available sandblast resistant material of rubber or the like which may have an adhesive backing for retaining the sheet 4 in place or a suitable adhesive may be applied directly to the stone or back of the sheet 4 for securing the sheet in place. Next individual blocks 5 and 6 of the same material as the sheet 4 having letters 7 and numbers 8 of the desired size and shape substantially completely cut out of the blocks except for short webs 18 between the letters 7 or numbers 8 and block material which prevent them from prematurely falling out of the blocks are selected and arranged in the desired order and spaced relation to give an indication of the area covered by the blocks whereby such area may be accurately laid out in pencil on the sheet 4 as shown in the FIG. 2.

The letters 7 and numbers 8 may be die cut to eliminate the need for a skilled draftsman and stencil cutter to lay out and cut the letters and assure uniformity of their size and shape. Appropriately located nicks in the cutting edges of the dies will cause formation of the webs 18 which prevent the letters and numbers from falling out. All of the blocks 5 and 6 may be of the same height as shown, but their widths will vary depending upon the configuration of the letters and numbers cut in the blocks and the required spacing therebetween. With blocks of proper width, placement of the blocks in side-by-side abutting relation will automatically establish the optimum spacing between the letters and numbers.

It is preferable when laying out the area on the sheet 4 where the blocks 5 and 6 will be finally placed to assemble the blocks in the proper order on the sheet 4 adjacent such areas to facilitate the layout. However, it should be understood that the blocks 5, 6 could just as well be set up somewhere else and the overall measurements taken for layout on the sheet 4 if desired. In any event, once the areas A, B, and C to be occupied by the blocks are outlined in pencil or the like as in FIG. 2, the sheet material 4 is cut out in such areas and removed for placement of the blocks directly against the stone face 3.

Figure 3:
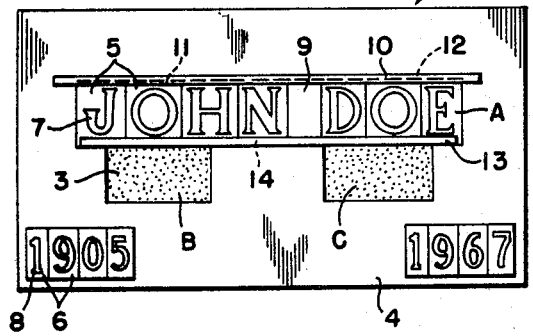

FIG. 3 shows the letter blocks 5 which comprise the first line of the inscription 2 positioned in the cutout area A in the proper spaced relation. A blank block 9 is disposed between the first and last name of the deceased to fix the spacing therebetween.

When the layout man is satisfied that all of the letter blocks 5 and spacer block 9 are in the proper position, a strip 10 of masking tape or the like is laid along the upper edges 11 of the blocks in overlapping relation with the adjacent edge 12 of the sheet 4. Another strip 13 of tape may be laid across the blocks 5 adjacent the lower edges 14 or across the middle of the blocks, but the strip 13 preferably does not overlie any portion of the sheet 4 or it will necessitate cutting of the strip 13 in that area to free the blocks from the sheet.

Figure 4:
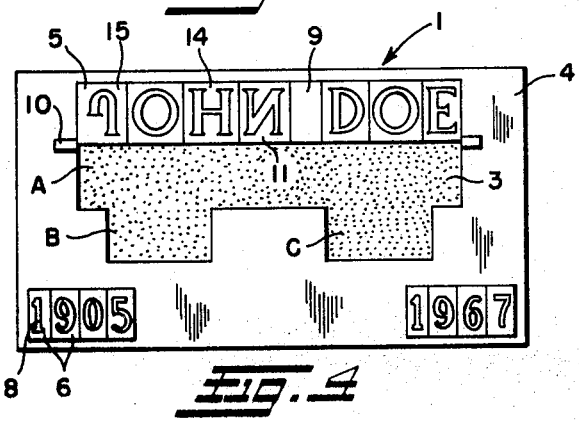

As will be apparent, the tape strips 10 and 13 will retain the several letter blocks 5 and spacer block 9 together to permit handling as a unit without disturbing their relative positions. Moreover, the tape strip 10 which overlaps the edge 12 of the cover sheet 4 may be used as a hinge to permit the letter blocks 5 and spacer block 9 to be swung away from the stone 1 as a unit to the FIG. 4 position exposing the stone and the backs 15 of the blocks for the application of a suitable adhesive such as rubber cement to one or both surfaces. Alternatively, the backs 15 of the blocks 5 and 9 may be prepasted and covered by individual pull sheets which may be peeled off when the blocks are turned over as just described. Afterwards, the blocks 5 and 9 are swung back into position against the area A of the stone 1 where they are retained in place by the adhesive. The blocks 5, 9 may be rolled in known manner to insure complete adhesion to the stone.

Figure 5:
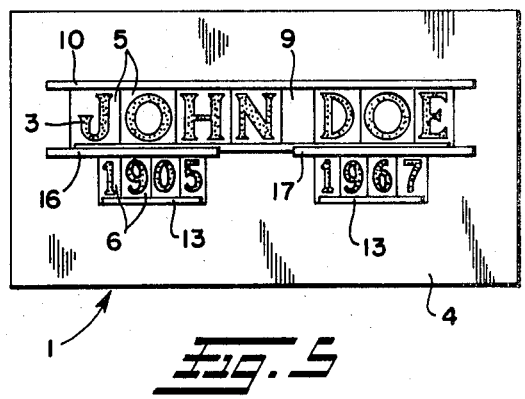

The same procedure is then repeated for attaching the number blocks 6 to the stone by placing them in the cutout areas B and C in contact with the stone 1 in the desired relation prior to the application of adhesive and taping the blocks which comprise each date together with one of the strips 16, 17 preferably overlapping an adjacent edge of the sheet 4 or the lower edges 14 of the letter blocks 5 as shown in FIG. 5 to permit swinging of the number blocks for each date as a unit away from the stone without disturbing their relative positions. Now adhesive may easily be applied to the stone or backs of the number blocks after which the number blocks are swung back into contact with the stone and rolled to make sure that the blocks adhere to the stone.

Figure 6:
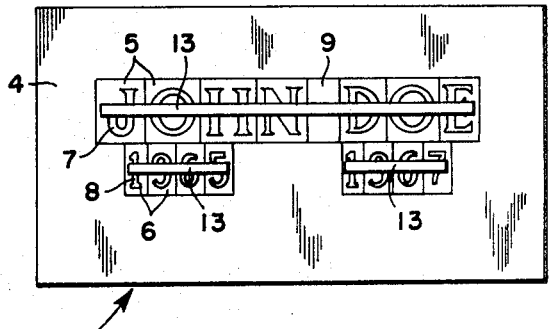
FIG. 6 is a schematic top plan view similar to FIG. 4 but showing another method by which the various letter and number blocks may be taped together.

Instead of taping the blocks 5, 6, and 9 to an adjacent edge of the cover sheet 4 to permit swinging of the blocks about such edge, the blocks may simply be taped together as shown in FIG. 6 inwardly of the edges of the sheet to permit complete removal of the blocks from the areas A, B, and C as a unit for the application of adhesive as before. Moreover, the blocks 5, 6, and 9 need not necessarily be positioned in the cutout areas A, B, and C for taping of the blocks together. Any flat surface will do so long as the blocks are supported in proper abutting relationship with the desired spacing therebetween while being taped.

Figure 8:
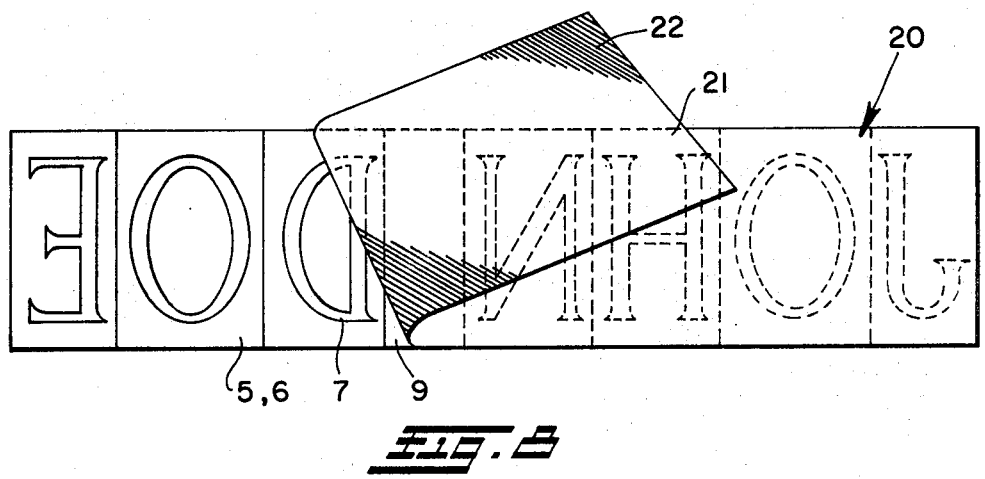
FIGS. 8 through 11 are schematic top plan views showing still another method by which the various letter or number blocks may be laid out on the stone for sandblasting the inscription.

In FIGS. 8 through 11 there is shown another method by which the stencil blocks 5, 6 may be laid out on the stone 1 for sandblasting an inscription therein. The stone 1 is covered with a thin sheet 4 of sandblast resistant material as before, and the areas to be covered by the blocks are cut out of the sheet 4 to permit placement of the blocks directly against the stone face 3. Prior to doing so, however, the individual letter or number blocks 5, 6 are joined together to permit handling as a unit using a strip 20 of suitable release paper 21 covered with an adhesive film 22 of rubber or like cement, such as commercially sold by 3M Co. under the brand name Scotch Brand Tape No. 465. The paper strip 20 is desirably approximately the same width as the height of the blocks, and is applied to the back sides of the blocks, which is best achieved by arranging the individual blocks in reverse order with the front sides of the blocks facing down to permit direct application of the paper strip 20 to the back sides without disturbing the desired relative positions of the individual blocks with respect to each other as shown in FIG. 8.

Figure 9:
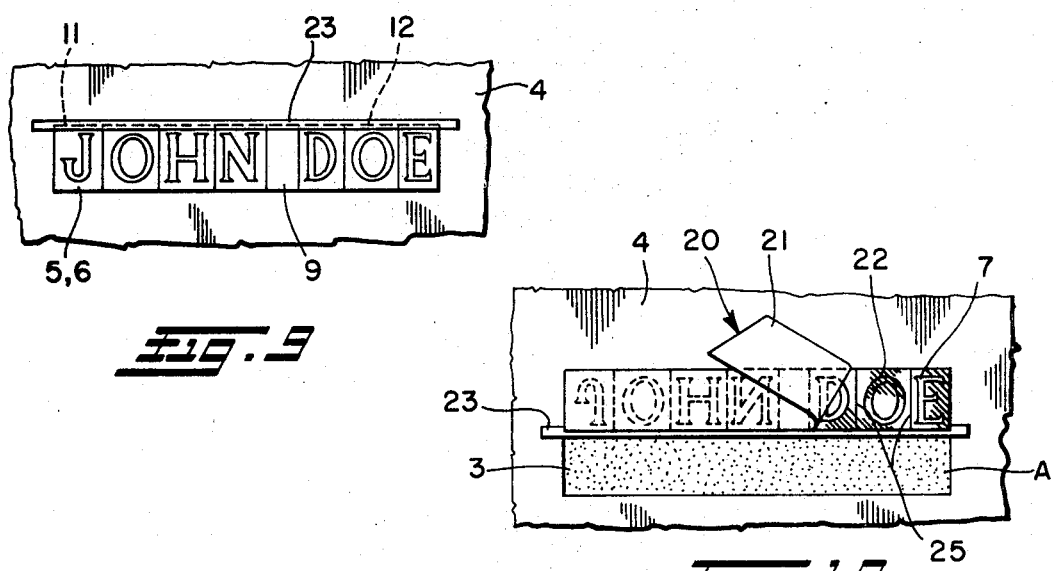
Figure 10:
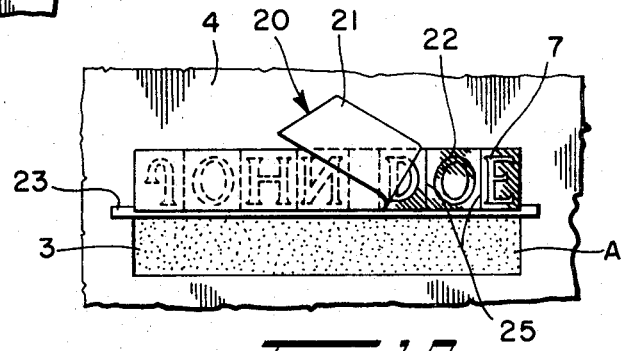
Figure 11:
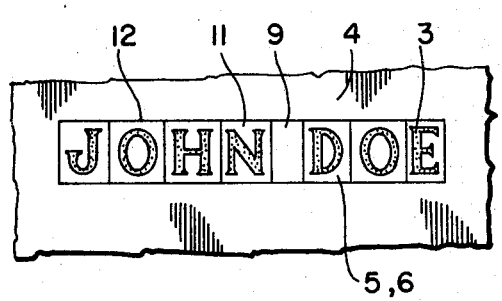

With the blocks thus taped together along their back sides, they may readily be handled as a unit and properly located on the stone with the front sides of the blocks facing up as shown in FIG. 9. Next a strip 23 of masking tape or the like may be applied along the upper edges 11 of the blocks in overlapping relation with the adjacent edge 12 of the sheet 4 as shown in FIG. 9. The tape 23 provides a hinge about which the blocks may be pivoted to expose the back sides of the blocks and permit removal of the paper strip 20 from such back sides as illustrated in FIG. 10.

During such removal of the paper strip 20, the adhesive film 22 on the paper strip readily transfers from the paper strip to the back sides of the blocks, thus avoiding the necessity of having to apply cement either to the backs of the blocks or to the face of the stone. The adhesive film 22 has the further advantage that it extends across the abutting edges 25 of the blocks and will actually hold the blocks together without the use of additional tape across the outer faces of the blocks. Accordingly, after the paper strip 20 has been applied to the back sides of the blocks, such paper strip may immediately be removed and the adhesive film 22 which is transferred to the back sides of the blocks will hold the blocks together and permit handling of the blocks without the paper strip or additional tape. This eliminates the necessity of having to tape the top edges of the blocks to the adjacent edge of the sheet material 4 to act as a hinge for swinging the blocks away from the stone for removal of the paper strip therefrom. In any event, after the paper strip 20 has been removed from the back sides of the blocks, the blocks are either swung back into contact with the stone about the tape hinge or directly applied to the stone without using the tape hinge and the blocks are rolled to make sure that the blocks adhere to the stone.

Regardless of which method is used to secure the stencil blocks to the stone, once the blocks are in place, the tape strips are removed if necessary to permit removal of the letters 7 and numbers 8 by cutting the webs 18 and prying the letters and numbers out, thereby leaving the stone exposed for sandblasting in conventional manner to form the desired inscription. Certain of the letters 7 and numbers 8 could be completely removed when the letters are die cut but because of the limp nature of the material it is preferable to leave the letters and numbers in to prevent distortion of the blocks during handling, and moreover some letters and numbers as for example the letter O, must be left in place during handling or the center section 20 will fall out.

Should there be any gaps between the blocks 5, 6 and 9 and the sheet 4 when the blocks are in their final adhered positions because of the areas A, B, and C having been cut too large, they must be masked with strips of the sheet material prior to sandblasting. When the sandblasting operation is completed, the cover 4 and blocks 5, 6 and 9 are removed and discarded and the stone is cleaned thereby completing the inscription. If a rubber cement is used as the adhesive for securing the blocks to the stone, the adhesive will adhere to the blocks during removal of the blocks from the stone after sandblasting and thereby eliminate the need for having to clean the adhesive from the stone after removal of the blocks.

From the above discussion, it is now apparent that the method of inscribing cemetery memorials as described herein may be performed much more rapidly than previous known methods. Moreover, the letters and numbers which comprise the inscription are quite uniform and very accurately located with respect to each other, and no special skills are required to perform the method of the present invention. Experience has shown that it takes a skilled workman about one hour to lay out and cut a stencil for the usual inscription, whereas the same inscription can be laid out for sandblasting in about 10 to 15 minutes using the method disclosed herein.

Although such method has been described with specific reference to the use of pre-cut or partially pre-cut letters and numbers, it should be apparent that pre-cut designs or symbols and the like could be used in like fashion.

I, therefore, particularly point out and distinctly claim as my invention:

1. A method of preparing a stone for sandblasting of an inscription therein comprising the steps of covering the surface of the stone to be sandblasted with a resilient protective sheet which is provided with at least one opening to expose the stone therebeneath, selecting individual blocks of protective sheet material having portions of the inscription pre-cut therein, arranging such individual blocks as a unit in the final desired spaced relation in such opening, taping one edge of the unit of blocks to an adjacent edge of the opening in the protective sheet to permit swinging of the unit in and out of contact with the exposed stone surface, swinging the taped unit out of contact and away from the stone surface, preparing at least one of the surfaces of the back side of the unit and the exposed stone for adhesive contact, and swinging the unit back into contact with the exposed stone surface to adhesively fix such unit to the exposed surface of the stone.

2. The method of claim 1 wherein the portions of the inscription are partially pre-cut in the blocks to retain the portions in the blocks during handling, and the portions are completely removed from the blocks after the units are affixed to the exposed areas of the stone.

3. The method of claim 2 wherein the portions of the inscription are die cut in the blocks using dies having nicks in their cutting edges to create webs between the portions and blocks which retain the portions in place during handling.

4. The method of claim 1 further comprising the step of using blank spacer blocks of such protective sheet material in such units wherever required.

5. The method of claim 1 further comprising the step of covering any portion of the stone left exposed surrounding the blocks after the blocks have been affixed to the stone.

6. The method of claim 1 wherein the unit of plural blocks is taped together to permit handling of such blocks as a unit without disturbing the desired spaced relation therebetween prior to the taping of one edge of the unit to an adjacent edge of the opening in the protective sheet.

7. The method of claim 6 wherein the unit of plural blocks is taped together useing an adhesive coated strip which is applied to the back sides of such blocks and subsequently removed therefrom prior to fixing such blocks to the stone.

8. The method of claim 1 wherein the surface of the back side of the unit of blocks is prepared for adhesive contact by applying an adhesive to the back side of the unit of blocks.

9. The method of claim 1 wherein the blocks are prepasted with an adhesive and covered by a pull sheet prior to the taping of the edge of a unit of blocks to the adjacent edge of the opening in the protective sheet, and the pull sheet is subsequently removed from the back side of the blocks to prepare said back side for adhesive contact with the stone.

10. The method of claim 7 wherein the adhesive on the strip is a rubber cement film which readily transfers from the strip to the backs of the blocks during removal of the strip to provide an adhesive coating on the backs of the blocks for fixing the blocks to the stone.

11. A method of preparing stone for sandblasting of an inscription therein utilizing individual blocks of protective sheet material having portions of the inscripton pre-cut therein, the method comprising the steps of arranging such individual blocks as a unit, face down and in reverse order, applying an adhesive film to the back side of the unit which holds the individual blocks together with respect to each other for handling, placing said unit with adhesive backing face up on the surface of the stone to adhesively fix the unit to the stone, and covering the remaining surface of the stone to be sandblasted with a resilient protective material, such resilient protective sheet material being applied to the surface of the stone to be sandblasted prior to the application of the inscription unit, such sheet material being provided with an opening to expose the stone therebeneath for application of the inscription, unit, and such adhesive film being applied as an adhesive coated strip wherein the adhesive readily transfers from the strip to the back of the unit upon removal of the strip to provide an adhesive coating film on the back of the blocks.

12. The method of claim 11 wherein the unit with adhesive strip backing is placed in the opening in the protective sheet material and one edge of the unit is taped to an adjacent edge of the opening in the protective sheet material to permit swinging of the unit in and out of contact with the exposed stone surface whereby the taped unit can be swung out of contact and away from the stone surface to permit removal of the tape thereby exposing the adhesive backing for adhesive contact with the exposed stone surface when the unit is brought back into contact with said stone surface.

References Cited

UNITED STATES PATENTS

| | | | |
|---|---|---|---|
| 2,162,332 | 6/1939 | Frick | 117—35.5 |
| 2,199,980 | 7/1940 | Behee | 51—312 |
| 2,251,647 | 8/1941 | Wartha | 117—35.5 |
| 3,137,978 | 6/1964 | Incantalupo | 51—312 |

OTHER REFERENCES

Bulletin, Fototype Inc., Chicago, Ill. (1945), 4 pages.

BENJAMIN A. BORCHELT, Primary Examiner

H. J. TUDOR, Assistant Examiner

U.S. Cl. X.R.

51—312; 117—35.5